Aug. 1, 1933.  P. RHEINLÄNDER  1,920,594
RING BALANCE
Filed Sept. 16, 1931
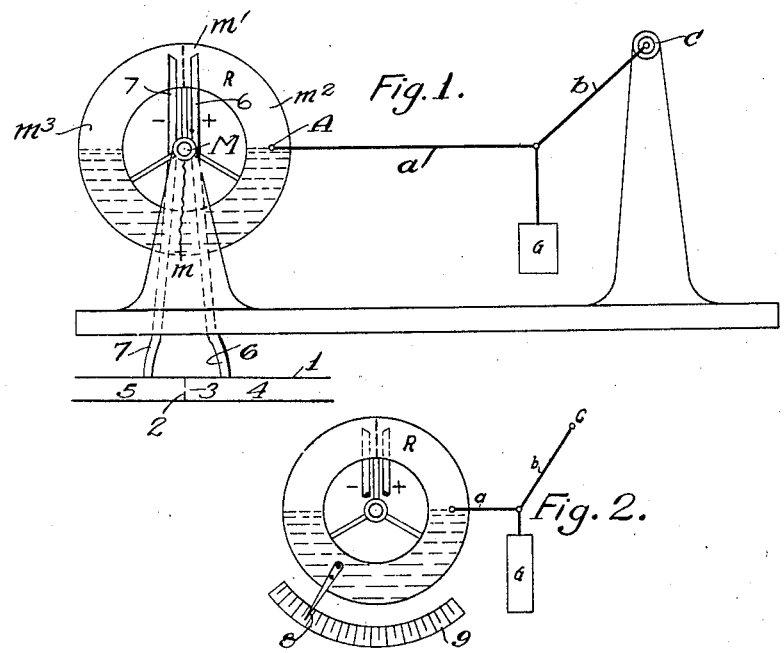
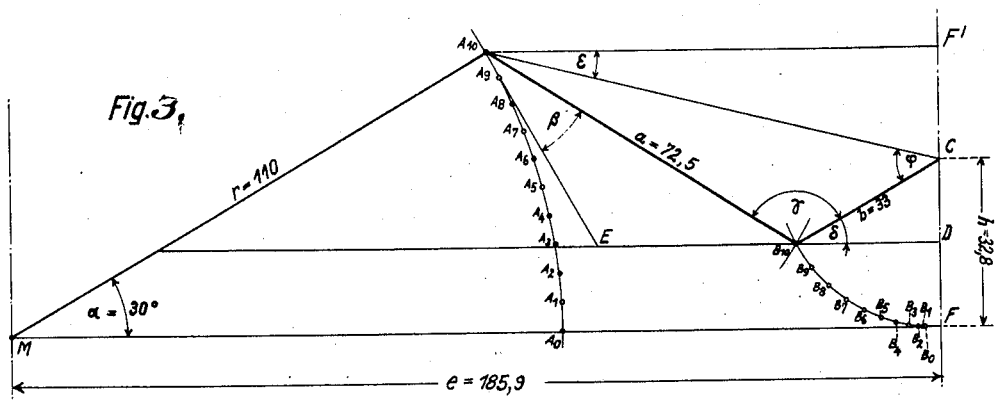
Inventor:
Dr.-Ing.
Paul Rheinländer Patented Aug. 1, 1933

1,920,594

UNITED STATES PATENT OFFICE 1,920,594

RING BALANCE

Paul Rheinländer, Altena in Westfalen, Germany, assignor to Paul de Bruyn, Dusseldorf, Germany Application September 16, 1931, Serial No. 563,134, and in Germany July 8, 1929

1 Claim. (Cl. 73—31)

This invention relates to improvements in differential gages of the kind known commonly as ring balance meters, in which to indicate or ascertain the differences in the pressures of a gas, fluid or liquid under pressure conveyed through conduits, an annular tube which is mounted for oscillatory movement and which has a partition therein forming chambers is employed into which chambers pressure is conveyed by means of pressure conduits which discharge from the main conduit into said chambers so that the annular tube or ring balance is turned in one direction or the other according to the differences in pressure in the said conduit.

Ring balance meters for measuring pressure differences are known in which the ring balance is loaded with eccentrically disposed weights rigidly secured thereto. The torsional moment produced by the weight which, in the state of inertia, is equal to that produced by the measuring force, that is to say, the force produced by the differences in pressure is positively proportional to the sine of the angle of displacement. There is a positive sine curve relation between the differential pressure acting on the ring balance and the displacement. The disadvantage of such construction is obvious, as in practice another relation between the measuring force and the displacement is desired, for example with simple pressure meters a rectilinear relation, and with pressure meters for measurement of gas velocity or quantity of gas a parabolic one.

The invention is illustrated, by way of example, in the accompanying drawing in which Figure 1 is a diagrammatic sectional elevation of a ring balance measuring apparatus embodying my improvements.

Figure 2 is a detail diagrammatic elevation of the same showing the pointer and scale.

Figure 3 is a diagram of calculations involved in the operation of my invention.

The ring balance R here shown is of usual form having the pivotal central axis M by means of which it is mounted in bearings $m$, said ring balance or annular tube having the partition $m'$ in its upper side so that chambers $m^2$, $m^3$ are formed at opposite sides of said partition, into which chambers conduits 6, 7 respectively discharge, said conduits leading from the chambers or reservoirs 4, 5 of the conduit 1 which has a partition 2 therein provided with a port 3 of reduced diameter and through which conduit 1 the gases, fluids or liquids under pressure, the differential of the static heads of which it is desired to measure, pass, as is usual in apparatus of this kind.

In practice the conduits 6, 7 are flexible and are usually made of rubber. Such construction is well known and forms no part of my present invention.

The ring balance R is here shown as provided with a pointer 8 which coacts with an indicating scale 9, as is usual. Heretofore in instruments of this kind the body of the ring has been loaded with eccentrically disposed weights rigidly secured thereto. The objections to such weights are hereinbefore stated.

According to the invention a positive relation is obtained between the measuring force and the displacement by suspending, by means of a guide link $a$ and a second guide link $b$, a counterweight G. The weight is suspended from the point of connection between the links $a$, $b$ and the latter link is connected at its upper end to a fixed point C which is spaced from the ring balance, the link $a$ being connected to the ring balance as at A. The weight is caused to move, when the ring balance is deflected, in a curved path outside the ring balance, to offer resistance to the movement of the ring balance, as will be understood. The following equation holds for the measuring force, that is the component of the force acting tangentially to the ring balance.

I. $$T = G \frac{\cos \beta \cos \delta}{\sin \gamma}$$

where as indicated in Figures 1 and 3, T is the active tangential component of the force which in the state of inertia is in equilibrium with the force produced by the pressure and G is the force of the weight due to gravity.

$\beta$ is the angle between the guide link $a$ and the tangent to the circle of radius $r$ and centre M, which is the circular path traced by the point of suspension Ao on the displacement of the ring balance. $\beta$=angle B A E.

$\gamma$ is the angle between the two guides ($a$ and $b$); angle A B C.

$\delta$ is the angle between the guide $b$ and the horizontal line B D; angle C B D.

The angles $\beta$, $\gamma$ and $\delta$ can be considered as functions of the angle of displacement $\alpha$ (angle Ao M A):

II. $$\beta = \delta + \lambda - \alpha - 90$$

III. $$\cos \gamma = \frac{a^2 + b^2 - (e - r \cos \alpha)^2 - (r \sin \alpha - h)^2}{2ab}$$

IV. $$\delta = \epsilon + \phi$$

where $a$ is the length of the first guide link,
$b$ is the length of the second guide link, $e = M F$, is the distance between the point C and the middle vertical erected at M, $h$ is the distance between the point C and the horizontal line M F, $r$ is the distance between the point of suspension $A_0$ and the centre M of the ring balance, $\epsilon$ is the angle $F' A C$ ($A F'$ horizontal), $\phi$ is the angle $B C A$.

The following equations hold:—

IVa, $\qquad \tan \epsilon = \dfrac{r \sin \alpha - h}{e - r \cos \alpha}$

IVb. $\cos \phi = \dfrac{(e - r \cos \alpha)^2 + (r \sin \alpha - h)^2 + b^2 - a^2}{2b\sqrt{(e - r \cos \alpha)^2 + (r \sin \alpha - h)^2}}$ All the values of the equation I are in terms of the angle of displacement $\alpha$. By substituting the values for $\beta$, $\gamma$ and $\delta$ from the equations II–IV in the Equation I an equation is obtained for T in which the angle of displacement is the only variable and the values G, $a$, $b$, $e$, $h$, $r$ are constants. For determining whether any positive function is obtainable between the measuring force T and the displacement $\alpha$ according to the present invention—the formula V for example required for measuring flow, $$T = c\alpha^2,$$

is substituted for Equation I, so that only the aforementioned constants and the functions of the angle will appear. Substituting for $\alpha$ five different values proportionally distributed within the measuring range, five equations may be obtained from which the constant values $a$, $b$, $e$, $h$, $r$ can be calculated. G and $c$ may be neglected in the calculation. If no real solutions are obtained it shows that the function cannot be proved. However it probably will be possible to prove the function if real values are obtained for the different constants. Whether the relation required holds for the whole range is determined by substituting other values for $\alpha$. By applying graphical methods the solution of the equations is made simpler than appears from their intricate form.

The dimensions of the guide links $a$ and $b$, the position of the point C and the distance $r$ between the suspension point $A_0$ and the centre M have been thus calculated for a ring balance for measuring the difference in pressure existing across an orifice plate or the like and which indicates or records the value of the square root of the difference in pressure. The dimensions are indicated by means of a diagram in Figure 3. It will appear that within the range of measurement ($\alpha = 0-30°$) the effective tangential component increases with the second power of the angle of displacement and owing to the equality of the work in turning the ring balance and in lifting the weight, the height to which the weight is raised must increase by the third power of the angle of displacement. This is proved by measuring the perpendiculars from the points $B_1$, $B_2$ etc. to $B_{10}$, erected on the horizontal line M F in Figure 3. The dimensions can be calculated in the same way if a rectilinear relation between displacement and pressure is desired for simple pressure meters. By varying the dimensions the relation between measuring force T and displacement $\alpha$ can be considerably varied. Consequently many other functions within the range of measurement can be proved, particularly if additional weights are secured to the guide links or to their extensions.

It will be understood from the foregoing that when the ring body R turns in counterclockwise direction the suspension point A moves upwardly and the guide $a$ lifts the weight G so that the guide $b$ and the weight move in a circular path partly around the other suspension point C.

It will be understood that the effect of the weight and the rotary movement of the ring scale is not simply proportional to the differential pressure of the gases, but it varies and it is increased beyond proportion if the differential pressure increases. This is effected by the double suspension of the weight G. The higher the weight is raised, the greater also is the counter-effect resisting the torsion of the balance.

What I claim is:

In measuring apparatus of the class described, in combination with a ring balance, a counterweight, a guide link connected to the ring balance and to the counterweight, and a guide link connected to the counterweight and to a fixed point, spaced from the ring balance, so that the weight is caused to move, when the ring balance is deflected, in a curved path outside the ring balance, to offer resistance to the movement of the ring balance.

PAUL RHEINLÄNDER.